United States Patent [19]

Gilman et al.

[11] 4,258,756
[45] Mar. 31, 1981

[54] COMPOSITE SHELL

[75] Inventors: John J. Gilman, Morristown; Ralph R. Saunders, Lafayette, both of N.J.

[73] Assignee: Allied Chemical Corporation, Morris Township, Morris County, N.J.

[21] Appl. No.: 70,207

[22] Filed: Aug. 27, 1979

[51] Int. Cl.³ ............................................. F16L 9/16
[52] U.S. Cl. ................................... 138/142; 138/130; 138/133; 138/144; 138/177; 174/35 MS; 174/109
[58] Field of Search ............... 138/130, 140, 141, 142, 138/143, 144, 154, 177; 156/187, 188; 75/122, 123 D, 170; 164/87; 335/301; 174/35 R, 35 MS, 108, 109; 220/3

[56] References Cited

U.S. PATENT DOCUMENTS

| | | | |
|---|---|---|---|
| 285,576 | 9/1883 | Coas | 138/142 X |
| 3,651,661 | 3/1972 | Darrow | 130/144 X |
| 3,856,513 | 12/1974 | Chen et al. | 164/423 X |
| 4,030,892 | 6/1977 | Mendelsohn et al. | 174/35 MS |
| 4,036,638 | 7/1977 | Ray et al. | 75/170 X |
| 4,126,287 | 11/1978 | Mendelsohn et al. | 174/35 MS X |
| 4,142,571 | 3/1979 | Narasimhan | 164/87 |
| 4,189,618 | 2/1980 | Bretts et al. | 174/35 MS |

*Primary Examiner*—James E. Bryant, III
*Attorney, Agent, or Firm*—Ernest D. Buff; Gerhard H. Fuchs

[57] ABSTRACT

A thin-walled annular shell of high rigidity relative to its unit weight is provided. The wall of the shell is a composite material built up layerwise of glassy alloy strips of high transverse aspect ratio such that each layer is a strip wrapped at a substantially 45° helix with respect to the elongate axis of the shell and with adjacent layers having alternating directions of wrap. Bonding between adjacent layers and between strips within each layer is accomplished in a selected manner such that the composite wall is structurally monolithic for thin-walled applications thereby taking substantially full advantage of the extraordinary strength properties of glassy alloy strip.

8 Claims, 3 Drawing Figures

U.S. Patent     Mar. 31, 1981     4,258,756
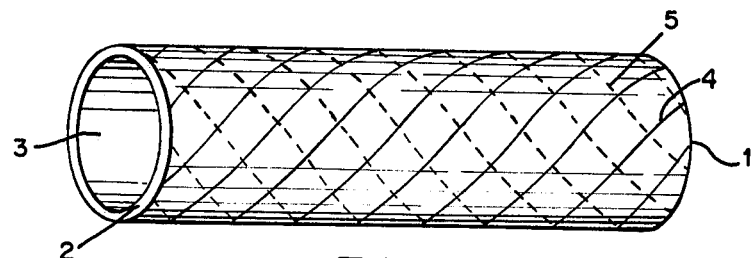
FIG. 1
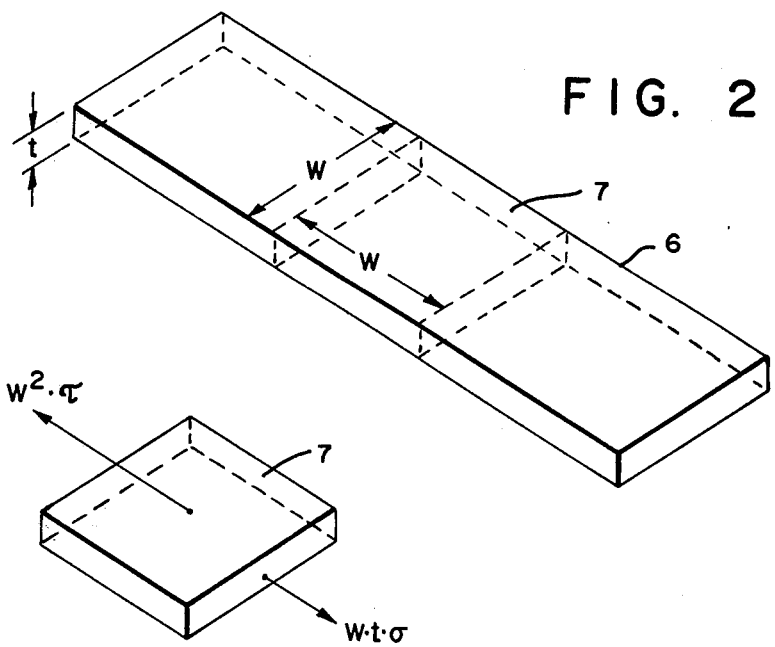
FIG. 2
FIG. 3

COMPOSITE SHELL

BACKGROUND OF THE INVENTION

This invention relates generally to rigid thin-walled annular shells and specifically to such structural shells built up layerwise from glassy alloy strips and selected bonding means.

Thin-walled shells are hollow structures having a wall thickness much smaller than the wall radius of curvature and are typically characterized by a radius to thickness ratio of at least about 10. Such structures are highly efficient in sustaining nonbending loads, i.e. loads that produce planar (biaxial) stress within the wall but no significant radial (triaxial) stress. These shells have high strength and rigidity relative to their weight (high specific strength) and are especially suited for such applications as light weight torsional shafts and conduits or vessels to contain high pressure fluids.

Thin-walled shells, such as tubing, may be constructed as a composite material by building up the wall layerwise from high strength strips, or other filaments, in combination with a bonding matrix. Such composite tubing frequently is superior to conventional monolithic tubing in that improved specific strength is obtained and in that the layered construction will retard failure crack propagation and thereby tend to prevent catastrophic failure. By selectively varying the lengthwise orientation of the high strength strips within adjacent layers, a pseudoisotropic material is obtained typically having a bulk strength greater than that of conventional monolithic materials. However, since the transverse strength of the strips is typically significantly less than their longitudinal strength, the composite material has a bulk strength significantly less than that of the maximum tensile strength of the elemental strips.

In contrast, the present invention utilizes, in a selected manner, glassy alloy strips to build up a thin-walled shell such that the composite wall material has a bulk strength approaching the ultimate strength of the glassy alloy strips.

SUMMARY OF THE INVENTION

The present invention provides a thin-walled annular shell of high rigidity relative to its unit weight. The wall of the shell is a composite material built up layerwise of glassy alloy strips of high transverse aspect ratio (ratio of strip width to strip thickness) such that each layer is a strip wrapped substantially at a 45° helix with respect to the elongate axis of the shell and with adjacent layers having alternating directions of wrap. Bonding between adjacent layers and between strips within each layer is accomplished in a selected manner such that the composite wall is structurally monolithic for thin-walled applications (i.e. applications involving nonbending loads and wherein the ratio of wall radius to thickness is at least about 10) thereby taking substantially full advantage of the extraordinary strength properties of glassy alloy strip, characteristically having a biaxial yield strength approaching the ultimate strength of the alloy.

Thus, the composite thin-wall embodies a "maximum construction" in several respects. First, glassy alloys have a tensile strength approaching the ultimate strength of the alloy (glassy or polycrystalline). Second, strips of glassy alloy manifest this extraordinary strength biaxially in contrast to conventional high strength strip having a substantial longitudinal anisotropy. Third, the strips are bonded in selected fashion to take full advantage of their high strength. Fourth, the adjacent layers are substantially orthogonally wrapped such that adjacent layers are reinforced biaxially and strips are oriented substantially along the direction of principal shear stress. Fifth, the layered construction retards failure crack propagation, thereby tending to prevent catastrophic failure of the shell under excessive loading.

Accordingly, the present invention provides a composite thin-walled shell, comprising:

(a) a plurality of substantially orthogonally-wrapped concentric layers, each of the layers being a glassy alloy strip of high transverse aspect ratio helically wrapped about the axis of concentricity, and with adjacent layers having alternating directions of wrap, further provided that the ratio of the inner radius to the combined thickness of the layers is at least about 10; and (b) bonding means for providing a joining shear strength between the layers and between the strips within each layer at least about equal to the tensile strength of the glassy alloy strip divided by the transverse aspect ratio of the strip.

The strips are considered to be substantially orthogonally wrapped when helically wrapped at an angular pitch such that the axes of the strips substantially correspond with the direction of principal shear stress. Preferable, the angular pitch is in the range of about 40° to 50°. Most preferable, the angular pitch is about 45°.

BRIEF DESCRIPTION OF THE DRAWINGS

Further details are given below with reference to the examples shown in the drawings wherein:

FIG. 1 is a perspective view of a thin-walled tube of the present invention, showing the orthogonal wrap of alternating wall layers.

FIGS. 2 and 3 schematically illustrate the relationship between load stress within a strip of the tube wall and bonding shear stress at the strip faces in reaction to the loading.

DESCRIPTION OF THE PREFERRED EMBODIMENTS

Glassy alloys are of considerable technological interest owing to their many extraordinary physical properties as compared to the properties characterizing the polycrystalline form of such alloys. The term "glassy alloy" is intended to refer to metals and alloys that are rapidly quenched from a liquid state to a substantially amorphous solid state, typically having less than about 50% crystallinity, and is considered to be synonomous with such terms as "amorphous metal alloy" and "metallic glass". Glassy alloys are well documented in the literature. An overview of their properties is given in "Metallic Glasses", *Physics Today* 28:5 (1975) by J. J. Gilman. Representative examples are shown in U.S. Pat. No. 3,856,513 "Novel Amorphous Metals . . . " issued Dec. 24, 1974 to H. Chen and D. Polk, hereby incorporated by reference. For an extensive background, see "Metallic Glasses", American Society For Metals (1978).

Specifically as regards the present invention, the mechanical properties of glassy alloys are extraordinary in that their yield strength approaches their ultimate strength, yet ordinarily fail plastically and not brittlely, and in that their strength properties are obtained substantially isotropically (nondirectionally). Thus, strips of glassy alloy manifest high biaxial strength (transverse strength comparable to longitudinal strength) in contrast to conventional high strength alloy strip typically having a high degree of anisotropy (transverse strength substantially less than longitudinal strength).

In the production of glassy alloy strips, typically an appropriate molten alloy is quenched at extreme quench rates, usually at least about $10^5°$ C. per second, by extruding the molten alloy from a pressurized crucible through an extrusion nozzle onto a high speed rotating quench surface, as is representatively shown in U.S. Pat. No. 4,142,571 for "Continuous Casting Method For Metallic Strips" issued Mar. 6, 1979 to M. Narasimhan, hereby incorporated by reference. Such filaments are necessarily thin, typically about 25 to 100 microns, owing to the extreme heat transfer requirements to prevent substantial crystallization, though considerably selectivity may be exercised respecting the width of the strip. Thus, glassy alloys are necessarily only available in commercial quantities in filamentary form; but advantageously, such filaments are produced in one step without need for subsequent heat treatment or mechanical reduction. This process advantage in combination with extraordinary mechanical properties renders glassy alloy strip ideally suited for building up high strength composite materials and articles, either online or offline with the continuous casting process.

Referring specifically to the drawings, in FIG. 1 a thin-walled tube 1 of the present invention is shown in perspective having a wall 2 enclosing an annular space 3. The wall 2 is built up of helically wrapped glassy alloy strips with adjacent layers having alternating directions of wrap. For example, the outer layer is shown as being formed by strip 4 having a clockwise curl and the first inner layer 5 having a counterclockwise curl. This alternating pattern is repeated throughout the wall 2. The strips are intimately bonded in a selected manner, as discussed in connection with FIGS. 2 and 3, so as to achieve a structurally monolithic wall composite taking substantially full advantage of the high strength of the glassy alloy.

Helical wrapping is done substantially at a 45° angular pitch, the angular pitch being the angle of the longitudinal axis of each strip with respect to the elongate axis of the tube. Since adjacent strips have alternating directions of wrap, adjacent strips are substantially at a 90° angle with respect to each other, and thus are said to be substantially orthogonally wrapped. The strips are considered to be substantially orthogonally wrapped when the axes of the strips are substantially aligned with the direction of principal shear stress within the loaded wall, which corresponds to an angular pitch of about 45° for a tube loaded in torsion. However, since shear stress varies as of function of sin (2p) where p is the pitch angle, there is little variation in shear over a small angular range about 45°. For example, at a pitch angle of 40° or 50°, shear stress is 98.5% of maximum.

The tube 1 is "thin-walled", as discussed above, such that the ratio of the inner radius of tube 1 to the thickness of wall 2 is at least about 10. For example, given that a radius-to-thickness ratio of 15 and a tube radius of 30 cm are desired, then the wall thickness will be 2 cm and will consist of about 400 layers (strips) if constructed of intimately bonded glassy alloy strips each having a thickness of 50 microns. Since the present invention is applied in thin-walled shells, radial stress is negligible relative to the biaxial stress within the strips, and thus, the strips are the primary load bearing material of the wall composite and not the bonding means.

In FIGS. 2 and 3, the relationship between tensile forces acting on individual strips and bonding shear strength between strips is illustrated. Phantom element 7 is within a wall strip 6 and has a length equal to the width of the strip. Element 7, upon being subjected to a tensile stress, is restrained by shear forces provided by adhesion to its neighboring elements. Equating these forces and solving for the shear stress, the following expression is obtained:

$$T = S/(w/t)$$

where:
S = load stress,
w = strip width,
t = strip thickness,
w/t = transverse aspect ratio of the strip, and
T = shear stress between adjacent bonded strips.

Therefore, if the strength of the strip is S, the adhesive strength that is needed to restrain the strip until it reaches its fracture strength is T. For example, if t = 50 microns and w = 1 cm, then w/t = 200; and if S = 40,000 kg/cm$^2$, T would need to be 200 kg/cm$^2$, which is quite reasonable for a conventional adhesive. This means that such tubes could be loaded, under torsion for example, to destruction of the strips but not the adhesive. Conversely, given a particular glassy alloy having a certain strength and after selecting an adhesive, the minimum required aspect ratio can be determined by the above formulation. For example, if the tensile strength of the glassy alloy is 40,000 kg/cm$^2$ and the selected adhesive has a metal-to-metal lap shear strength of 400 kg/cm$^2$, then the minimum aspect ratio for the strip is 100. It is noted that by using strips of high aspect ratio, the strength of the adhesive is leveraged so that a structurally monolithic composite results thereby taking full advantage of the high strength of the strips.

Generally, any type of adhesive is suitable that provides a bonding shear strength according to the above formulation and is compatible for joining glassy alloy substrates. Standard preparatory surface treatment of cleaning and etching may be done to take full advantage of the bonding properties of the adhesive. Commercially available epoxy adhesives are representative of satisfactory adhesives. For example, nylon-epoxy adhesives and epoxy-polyamide adhesives provide metal-to-metal bonding shear strength of about 140 kg/cm$^2$ to about 450 kg/cm$^2$.

Bonding may also be accomplished by soldering or brazing provided the bonding shear strength of the join meets the above strength requirement and further provided that the melting temperature of the solder or brazing material is less than the glass transition temperature for the particular glassy alloy, typically 400° to 500° C. If the glassy alloy were crystallized (and no longer glassy), then its extraordinary strength properties would be diminished.

Wrapping of the multilayered composite shell may be done by conventional means for forming composite tubing, for example by automated wrapping onto a mandrel as representatively shown in U.S. Pat. No. 4,013,102 "Composite Tubing" issued Mar. 22, 1977 to J. Delorean and C. Dirks, hereby incorporated by reference. The bonding agent may be interjected between the turns of the strips during wrapping followed by heat treatment as required to complete bonding, e.g. furnace soldering, brazing, or adhesive curing. The shape of the cross-section of the shell is optionally selected according to the cross-section of the mandrel onto which the composite is formed.

The structural shells of the present invention may be used not only as thin-walled tubing but also as a reinforcing outer layer for conventional piping. Also, the high strength shells may be used as protective shrouds, i.e. annular cylinders of low length to diameter ratio. The shells may be used as magnetic shields, taking advantage of the combination of mechanical hardness and magnetic softness characteristic of many glassy alloys, especially ferrous glassy alloys. Generally, the temperature of the shell in use should be less than the glass transition temperature of the particular glassy alloy.

Compositionally, a wide range of glassy alloys are disclosed in literature, thereby permitting flexibility in choosing a particular glassy alloy according to the particular use for a shell of the present invention. By way of example, reference is made to U.S. Pat. No. 4,036,638 "Binary Amorphous Alloys of Iron or Cobalt and Boron" issued July 19, 1977 to R. Ray and S. Kavesh, hereby incorporated by reference, in which is disclosed iron-boron glassy alloys having extraordinary tensile strength and specific strength.

Although the present invention has been described in conjunction with preferred embodiments, it is to be understood that modifications and variations may be utilized without departing from the principles and scope of the invention as those skilled in the art will readily understand. Accordingly, such modifications and variations may be practiced within the scope of the following claims:

What is claimed is:
1. A composite thin-walled shell, comprising:
 (a) a plurality of substantially orthogonally-wrapped concentric layers, each of said layers being a glassy alloy strip of high transverse aspect ratio helically wrapped about the axis of concentricity, and with adjacent layers having alternating directions of wrap, further provided that the ratio of the inner radius to the combined thickness of the layers is at least about 10; and
 (b) bonding means for providing a joining shear strength between said layers and between said strips within each layer at least about equal to the tensile strength of said glassy alloy strip divided by said transverse aspect ratio.

2. The composite shell of claim 1 wherein said strips are helically wrapped at about a 40° to 50° angular pitch with respect to the axis of concentricity.

3. The composite shell of claim 2 wherein said strips are helically wrapped at about a 45° angular pitch.

4. The composite shell of claim 1 wherein said aspect ratio of said strips is at least about 100.

5. The composite shell of claim 1 wherein the glassy alloy has an iron-boron compositional base.

6. The composite shell of claim 1 wherein said strips are joined adhesively.

7. The composite shell of claim 1 wherein said strips are joined by brazing at a temperature less than the glass transition temperature of the glassy alloy.

8. The composite shell of claim 1 wherein said strips are joined by soldering at a temperature less than the glass transition temperature of the glassy alloy.

* * * * *